(12) United States Patent
Pajukoski et al.

(10) Patent No.: US 8,867,589 B2
(45) Date of Patent: Oct. 21, 2014

(54) METHOD AND APPARATUS FOR MULTIPLEXING CONTROL AND DATA CHANNEL

(75) Inventors: Kari Pajukoski, Oulu (FI); Esa Tiirola, Kempele (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 0 days.

(21) Appl. No.: 13/332,956

(22) Filed: Dec. 21, 2011

(65) Prior Publication Data

US 2012/0106482 A1 May 3, 2012

Related U.S. Application Data

(63) Continuation of application No. 11/867,343, filed on Oct. 4, 2007, now Pat. No. 8,102,896.

(60) Provisional application No. 60/828,085, filed on Oct. 4, 2006.

(51) Int. Cl.
| H04B 1/00 | (2006.01) |
| H04J 13/00 | (2011.01) |
| H04L 5/00 | (2006.01) |

(52) U.S. Cl.
CPC ........... *H04J 13/0003* (2013.01); *H04L 5/0026* (2013.01); *H04J 13/0044* (2013.01); *H04L 5/0053* (2013.01)
USPC ............................ 375/146; 375/299; 370/211

(58) Field of Classification Search
USPC ................. 375/141, 146, 260, 267, 298, 299; 370/203, 204, 208, 211, 321, 326, 347, 370/442, 474, 478
See application file for complete search history.

(56) References Cited

U.S. PATENT DOCUMENTS

| 5,440,542 | A | 8/1995 | Procter et al. | |
| 5,966,373 | A | 10/1999 | Stephenson et al. | |
| 6,064,663 | A | 5/2000 | Honkasalo et al. | |
| 6,081,536 | A | 6/2000 | Gorsuch et al. | |
| 6,697,347 | B2 * | 2/2004 | Ostman et al. | 370/335 |
| 6,912,241 | B2 | 6/2005 | Giannakis et al. | |
| 7,352,723 | B2 | 4/2008 | Barry et al. | |
| 7,397,839 | B2 * | 7/2008 | Maeda et al. | 375/141 |
| 7,447,504 | B2 | 11/2008 | Lohr et al. | |
| 7,477,697 | B2 | 1/2009 | Pauli et al. | |
| 7,486,698 | B2 | 2/2009 | Betts et al. | |
| 7,535,821 | B2 * | 5/2009 | Son et al. | 370/208 |
| 7,583,582 | B2 | 9/2009 | van Nee | |
| 7,613,245 | B2 | 11/2009 | Cho et al. | |
| 7,916,772 | B2 * | 3/2011 | Proctor et al. | 375/148 |

(Continued)

FOREIGN PATENT DOCUMENTS

| EP | 1 560 359 | 8/2005 |
| EP | 1560359 A1 | 8/2005 |

OTHER PUBLICATIONS

Extended European Search Report dated Oct. 2, 2012 in counterpart application EP 07825274.9-2411, 7 pp.

(Continued)

*Primary Examiner* — Dac Ha (57) ABSTRACT

An approach is provided for performing control signaling. Data and control information are received. The control information is orthogonalized using block-level spreading. The data and the orthogonalized control information are multiplexed at a symbol-level.

13 Claims, 10 Drawing Sheets

(56) References Cited

U.S. PATENT DOCUMENTS

| | | | |
|---|---|---|---|
| 8,320,434 B2* | 11/2012 | Kim et al. | 375/220 |
| 2002/0021744 A1 | 2/2002 | Iida | |
| 2002/0126740 A1* | 9/2002 | Giannakis et al. | 375/143 |
| 2004/0120274 A1* | 6/2004 | Petre et al. | 370/320 |
| 2005/0094709 A1 | 5/2005 | Lakkis | |
| 2006/0262870 A1* | 11/2006 | Khan | 375/260 |
| 2006/0285601 A1 | 12/2006 | Julian et al. | |
| 2007/0011550 A1 | 1/2007 | Agrawal et al. | |
| 2007/0189151 A1 | 8/2007 | Pan et al. | |
| 2007/0217388 A1 | 9/2007 | Shiizaki et al. | |
| 2007/0258540 A1* | 11/2007 | Ratasuk et al. | 375/267 |
| 2008/0080423 A1* | 4/2008 | Kolding et al. | 370/329 |
| 2009/0149187 A1 | 6/2009 | Miki et al. | |
| 2009/0296563 A1 | 12/2009 | Kishiyama et al. | |

OTHER PUBLICATIONS

Lucent Technologies: Precoded FDM Reference Signals for SC-FDMA, R1-061876, Cannes France, Jun. 27-30, 2006, 7 pp.
TSG-RAN WG1 LTE AdHoc; R1-061862, "Uplink Non-Data-Associated Control Signaling," Ericsson; Cannes, France; Jun. 27-30, 2006.
3GPP TSG,RAN WG1 LTE, Ad Hoc; R1-061674, "Single-Carrier Based Multiplexing of Uplink L1/L2 Control Channel," MTT DoCoMo, Fujitsu, NEC, Sharp, Toshiba Corporation; Cannes, France, Jun. 27-30, 2006.
3GPP TSG, RAN WG1 LTE Ad Hoc; R1-061675, "Data-Non-Associated L1/L2 Control Channel Structure for E-ULTRA Uplink," NTT DoCoMo, Sharp, Toshiba Corporation; Cannes, France; Jun. 27-30, 2006.
3GPP RAN1 LTE Ad Hoc; R1-061699; "Uplink ACK/NACK Signaling: FDM vs. TDM," Samsung; Cannes, France; Jun. 27-30, 2006.
3GPP TSG RAN1 LTE Ad Hoc; R1-061802; "Multiplexing and Link Analysis of CQI Channel in UL," Qualcomm Europe; Cannes, France; Jun. 27-30, 2006.
S. Zhou et al., "Chip-Interleaved Block-Spread Code Division Multiple Access," IEEE Transactions on Communications, vol. 50, No. 2, Feb. 1, 2002 (14 pp.).
3GPP TR 25.814 V7.0.0 (Jun. 2006), 3rd Generation Partnership Project, Technical Specification Group Radio Access Network, Physical Layer Aspects for Evolved Universal Terrestrial Radio Access, p. 74, line 1-line 16, line 24-line 29, figure 9.1.1.23-1.
Ericsson: Uplink Non-Data-Associated Control Signaling. AdHoc LTE, Cannes, France, pp. 1-3 (2006).
International Search Report and Written Opinion, PCT/IB2007/002952, May 5, 2008, pp. 1-16.
Nokia: Orthogonal Multiplexing of L1/L2 Control Signals with UL Data. 3GPP TSG RAN WG1 #47, Riga, Latvia, p. 1 (2006).
Nokia: TDM Based Multiplexing Schemes Between L1/L2 Control and UL Data. 3GPP TSG RAN WG1 #46bis, Seoul, Korea, p. 1-4 (2006).
NTT Docomo: Physical Channels and Multiplexing in Evolved UTRA Uplink, Ad Hoc on LTE, Sophia Antipolis, France, p. 10 (2005).
Qualcomm Europe: Multiplexing and Link Analysis of CQI Channel in UL. 3GPP TSG RAN1 LTE Ad Hoc, Cannes France, pp. 1-6 (2006).
Fernandes, Pedro et al., "Effects of Multi-User MIMO Scheduling Freedom on Cellular Downlink System Throughput," Proceedings IEEE 60th Vehicular Technology Conference, Sep. 2004.

* cited by examiner

METHOD AND APPARATUS FOR MULTIPLEXING CONTROL AND DATA CHANNEL

RELATED APPLICATIONS

This application is a continuation of U.S. patent application Ser. No. 11/867,343 filed on Oct. 4, 2007 which claims the benefit of the earlier filing date under 35 U.S.C. §119(e) of U.S. Provisional Application Ser. No. 60/828,085 filed Oct. 4, 2006, entitled "Method and Apparatus For Multiplexing Control And Data Channel," the entireties of which is incorporated herein by reference.

BACKGROUND

Radio communication systems provide users with the convenience of mobility along with a rich set of services and features. This convenience has spawned significant adoption by an ever growing number of consumers as an accepted mode of communication for business and personal uses in terms of communicating voice and data (including textual and graphical information). A continual challenge in such communication systems involves managing control information. To efficiently utilize bandwidth, control signals and data signals are multiplexed. Multiplexing schemes include block-level multiplexing and symbol-level multiplexing. One drawback with block-level multiplexing is that the allocation granularity can be too coarse. With symbol-level multiplexing, orthogonalization of the control signal between, for instance, two streams of a Multiple-Input Multiple-Output (MIMO) system is of concern.

SOME EXEMPLARY EMBODIMENTS

Therefore, there is a need for an approach to provide efficient multiplexing of control information and data.

According to one embodiment of the invention, a method comprises receiving data and control information. The method also comprises orthogonalizing the control information. Further, the method comprises multiplexing, at a symbol-level, the data and the orthogonalized control information to output multiplexed information.

According to another embodiment of the invention, an apparatus comprises a spreading module configured to receive data and control information and to orthogonalize the control information. The apparatus also comprises a multiplexer configured to multiplex, at a symbol-level, the data and the orthogonalized control information to output multiplexed information.

According to another embodiment of the invention, a system comprises a block-level spreading module configured to spread a modulated and encoded control symbol to output an orthogonalized control symbol. The system also comprises a multiplexer configured to multiplex a data symbol and the orthogonalized control symbol. Additionally, the system comprises a transform module configured to transform the multiplexed symbol using a transform function. Further, the system comprises an inverse transform module configured to apply an inverse of the transform function to the transformed multiplexed symbol to output a transmission signal.

According to another embodiment of the invention, a method comprises receiving control information. The method also comprises orthogonalizing the control information using block-level spreading, wherein the orthogonalized control information is used for a plurality of user equipment comprising a virtual multiple input multiple output (MIMO) system.

According to yet another embodiment of the invention, a system comprises a spreading module configured to receive control information, and to orthogonalize the control information using block-level spreading. The orthogonalized control information is used for a plurality of user equipment comprising a virtual multiple input multiple output (MIMO) system.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing control signaling in a communication network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a multi-input multi-output (MIMO) system, it is recognized by one of ordinary skill in the art that the embodiments of the inventions have applicability to any type of communication system.

Figure 1:
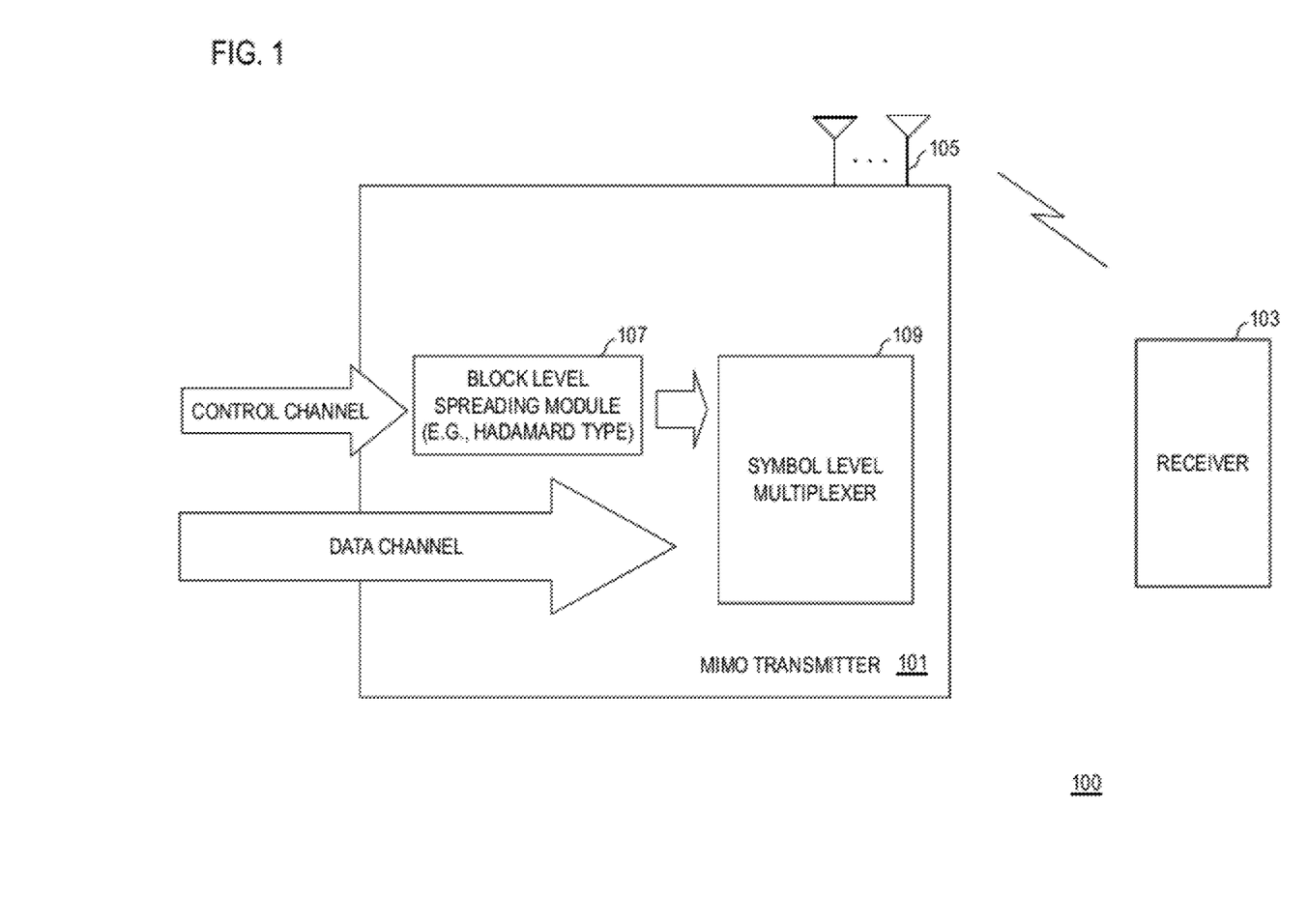
FIG. 1 is a diagram of the architecture of a transmitter capable of multiplexing control information and data, in accordance with an embodiment of the invention.

FIG. 1 is a diagram of the architecture of a transmitter capable of multiplexing control information and data, in accordance with an embodiment of the invention. According to one embodiment, a communication system 100 is a UTRAN (Universal Terrestrial Radio Access Network) long term evolution (LTE) system—also referred to as 3.9G. One or more transmitters 101 (of which one is shown) communicate with receiver 103. Each of these components 101, 103 can be deployed in either a mobile station or a base station; also, such components 101, 103 can be integrated using common hardware, firmware, and/or software. The terms "mobile station (MS)," "user equipment (UE)," "user terminal," and "mobile node (MN)," are used interchangeably depending on the context to denote any type of client device or terminal.

As shown, in one embodiment, the transmitter 101 is a MIMO transmitter. Thus, the transmitter 101 can simultaneously transmit multiple data streams from multiple antennas 105. The receiver 103 can receive the transmitted streams via multiple antennas, where the receiver can derive channel response matrix based on received pilot symbols, and perform receiver spatial processing. The receiver 103 can then combine the signals to obtain an enhanced channel response signal. That is, this arrangement supports parallel transmission of independent data streams to achieve high data rates. The system 100 provides multiple parallel streams or layers to the receiver 103. Multi-layer transmission may be applied for downlink (DL) as well as uplink (UL) transmission.

The transmitter 101, according to certain embodiments, provides a transmission scheme capable of block level spreading (e.g., Hadamard spreading) via a spreading module 107 and symbol level multiplexing using a symbol level multiplexer 109. Such schemes can be deployed in Single Carrier-Frequency Division Multiple Access (SC-FDMA) based Long Term Evolution (LTE) uplink communication, for example. SC-FDMA can be realized also using DFT-S-OFDM principle, which is detailed in 3 GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on the different sub-bands.

Figure 2A:
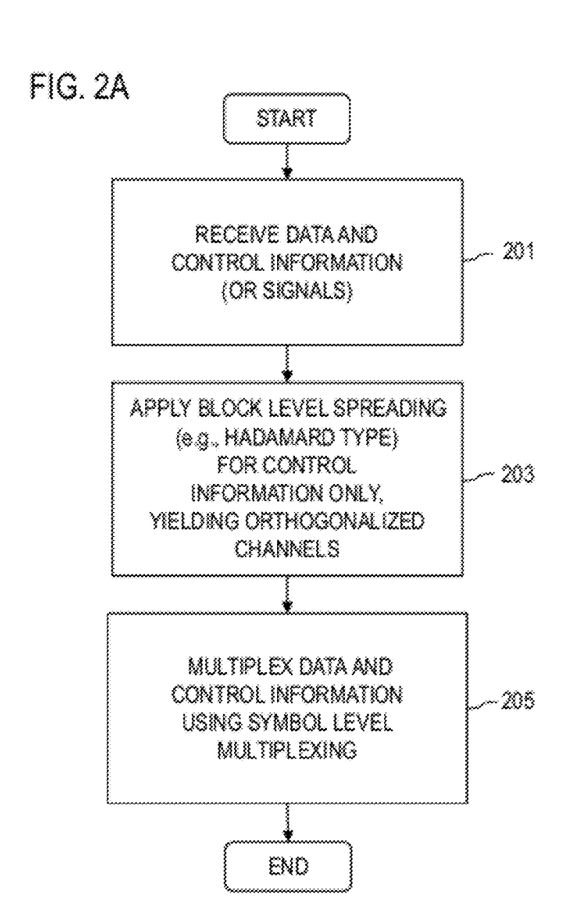
FIGS. 2A and 2B are, respectively, a flowchart of a process for multiplexing control channel and data channel, and a flowchart of a channelization process for control signals, in accordance with various embodiments of the invention.
Figure 2B:
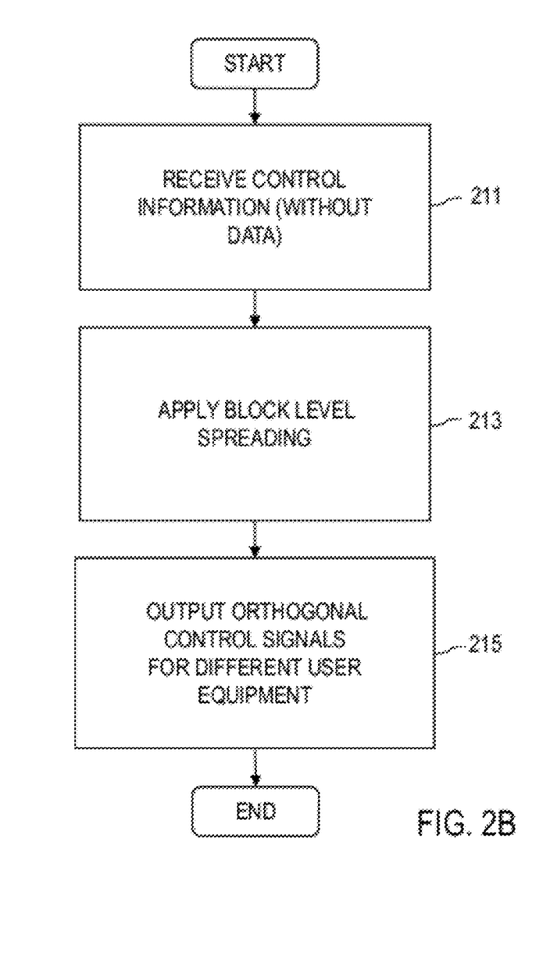

FIGS. 2A and 2B are, respectively, a flowchart of a process for multiplexing control channel and data channel, and a flowchart of a channelization process for control signals, in accordance with various embodiments of the invention. This process is described with respect to the system 100 of FIG. 1. In step 201, data and control information is received, whereby the control channel is input to the block level spreading module 107. By way of example, a Hadamard-type spreading function is applied to the control information to orthogonalize the control information, as in step 203. That is, orthogonality is maintained by the block level spreading between the code information. With different spreading factors, orthogonal control signals can be generated for different terminals. Assignment of the block level spreading code (i.e., cover code) can be based on existing dynamic signaling used for demodulation reference signal (DM RS) allocation, according to an exemplary embodiment. The demodulation reference signal is used by the base station to estimate the UL channel before decoding the data.

In an exemplary embodiment, Walsh-Hadamard spreading is used by the block level spreading module 107 to create orthogonal code channels, in which different users can transmit their control signals. Such control channels are multiplexed with the data channels. In this regard, in case of single user multi-stream (i.e., MIMO) transmission, the Walsh-Hadamard spreading is applied in the antenna domain. As a consequence, this approach can achieve transmitter diversity gain provided by the underlying Walsh-Hadamard spreading in the antenna domain. In addition, this approach, according to one embodiment, can use the same spreading in order to improve the detection reliability in case of single user MIMO transmission; such approach can arrange orthogonal control signaling for MIMO application with symbol level multiplexing between control and data channels.

Next, the output of the block level spreading module 107 is provided to the symbol level multiplexer 109, which multiplexes this output with data from the data channel (step 205). This process, by way of example, is used in uplink control signaling; although it is contemplated that such process can also be utilized in the downlink.

Uplink control signaling can be divided into data-associated and data non-associated control signaling. Data-associated control signaling is typically transmitted with uplink data transmission. Data-associated with signaling includes, for example, transport format and error control information (e.g., Hybrid Automatic Repeat Request (HARM) scheme), associated with uplink data transmission. Data non-associated control signaling includes, for example, Channel Quality Information (CQI), ACK (Acknowledgement)/NACK (Negative Acknowledgement), and MIMO feedback (FB), and thus, can be transmitted independently of uplink data transmission.

According to certain embodiments, three multiplexing combinations for the uplink pilot, data, and L1/L2 (Layer 1/Layer 2) control signaling within a sub-frame that are considered for a single UE (User Equipment) are as follows: (1) multiplexing of pilot, data, and data-associated L1/L2 control signaling; (2) multiplexing of pilot, data, data-associated, and data-non-associated L1/L2 control signaling; and (3) multiplexing of pilot and data-non-associated L1/L2 control signaling. According to various embodiments, the transmission scheme involves multiplexing between data and control (data-associated and data-non-associated) in MIMO and V-MIMO (Virtual MIMO) cases. By way of example, in single-carrier FDMA (Frequency Division Multiple Access), time-domain multiplexing is used for the above-mentioned three multiplexing combinations in order to retain the advantageous single-carrier feature with low PAPR (Peak to Average Power Ratio).

In addition to the above MIMO application, the transmitter 101 can utilize a channelization method for the control signals, as shown in FIG. 2B. In step 211, control information is received (i.e., data-non-associated) and undergoes block level spreading, as in step 213. The spreading results in orthogonal control signals (step 215). Thus, the transmitter 101 provides for the generation of orthogonal control signals for different multi-user (MU) MIMO UEs operating in different cells of a synchronized network. For example, this can be realized using a spreading factor (SF) of three (e.g., generalized chirp-like (GCL) type of spreading) for control signaling, and applying three different spreading coded based on frequency reuse pattern of 1/3.

To better appreciate the multiplexing scheme of the MIMO transmitter 101, it is instructive to examine two Time-Division Multiplexing (TDM) based methods for multiplexing control and data signals: block-level multiplexing and symbol level multiplexing.

Figure 3:
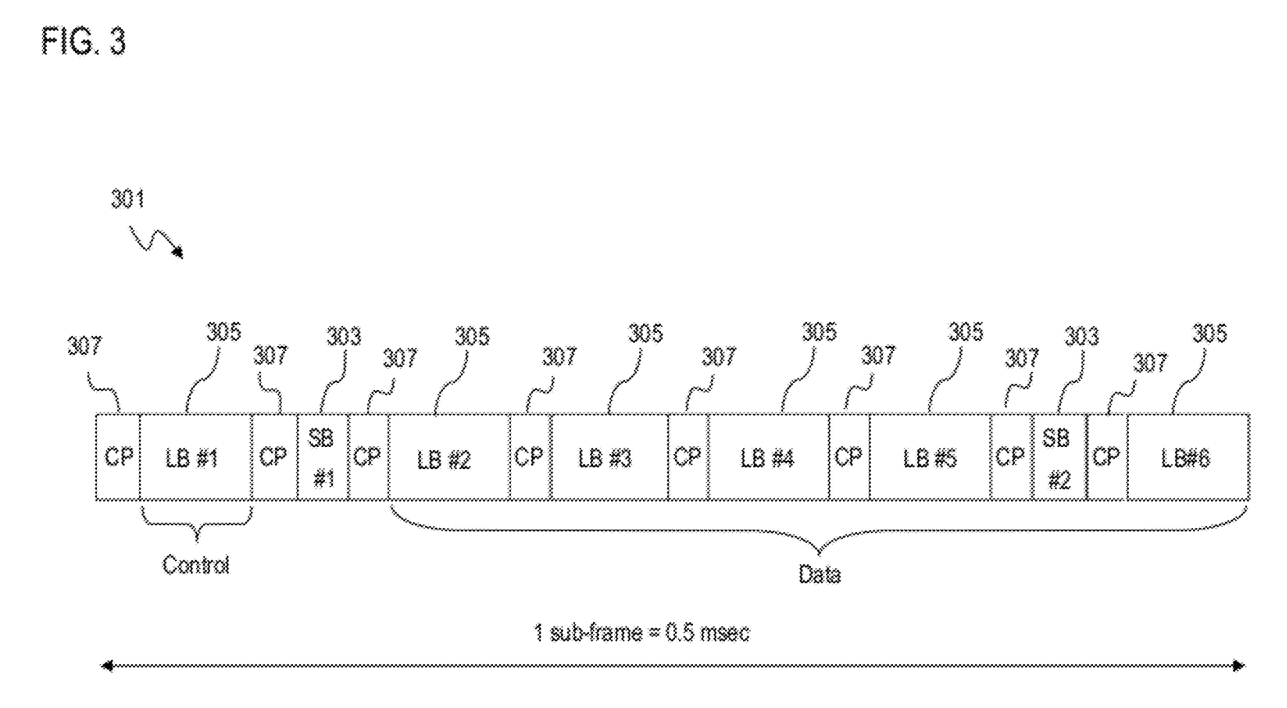
FIG. 3 is a diagram showing a block level multiplexing scheme, in accordance with an embodiment of the invention.

FIG. 3 is a diagram showing a block level multiplexing scheme, in accordance with an embodiment of the invention. In this example, a basic sub-frame structure 301 for the uplink transmission is provided in which two short blocks (SB) 303 and six long blocks (LB) 305 per sub-frame are used. The two short blocks 303 can be used for reference signals for coherent demodulation and/or control/data transmission, while the six long blocks 305 are used for control and/or data transmission. Further, cyclic prefix (CP) fields 307 are deployed at the start of the frame 301 and are interspersed throughout to separate the short blocks 303 and the long blocks 305.

As mentioned, block level multiplexing provides coarse allocation granularity. In this example, a predetermined number (e.g., 6) of LBs 305 are specified in each UL sub-frame. A single LB allocation exhibits 16.7% control overhead; control overhead with two LBs equals to 33.3%, and so on. It is also noted that the minimum overhead is quite large, particularly with large bandwidth allocations. It has been shown that in many cases, e.g., ACK/NACK can be conveyed reliably with only a few symbols (with overhead<5%).

A benefit of block level multiplexing is that multiplexing of multiple orthogonal control data streams, e.g., in V-MIMO case, can be readily accomplished using, for instance, distributed FDMA (Frequency Division Multiple Access). That is, the data part is transmitted using the same frequency/time resources, whereas orthogonal channels are provided for control information. It is assumed that in MIMO applications, there is some benefit in keeping (at least part of) the control signaling orthogonal. This is justified by the fact that the requirements for the control singling are different than with data channels. It is recognized that control signaling is typically time critical, and thus, re-transmissions cannot be used. Also of note, the QoS (Quality of Service) requirements for control signaling are typically higher than for data channels. Further, in the MIMO case, usage of orthogonal resources can be accepted for limited amount of data, such as control signaling without too severe degradation of the data symbol rate.

Figure 4:
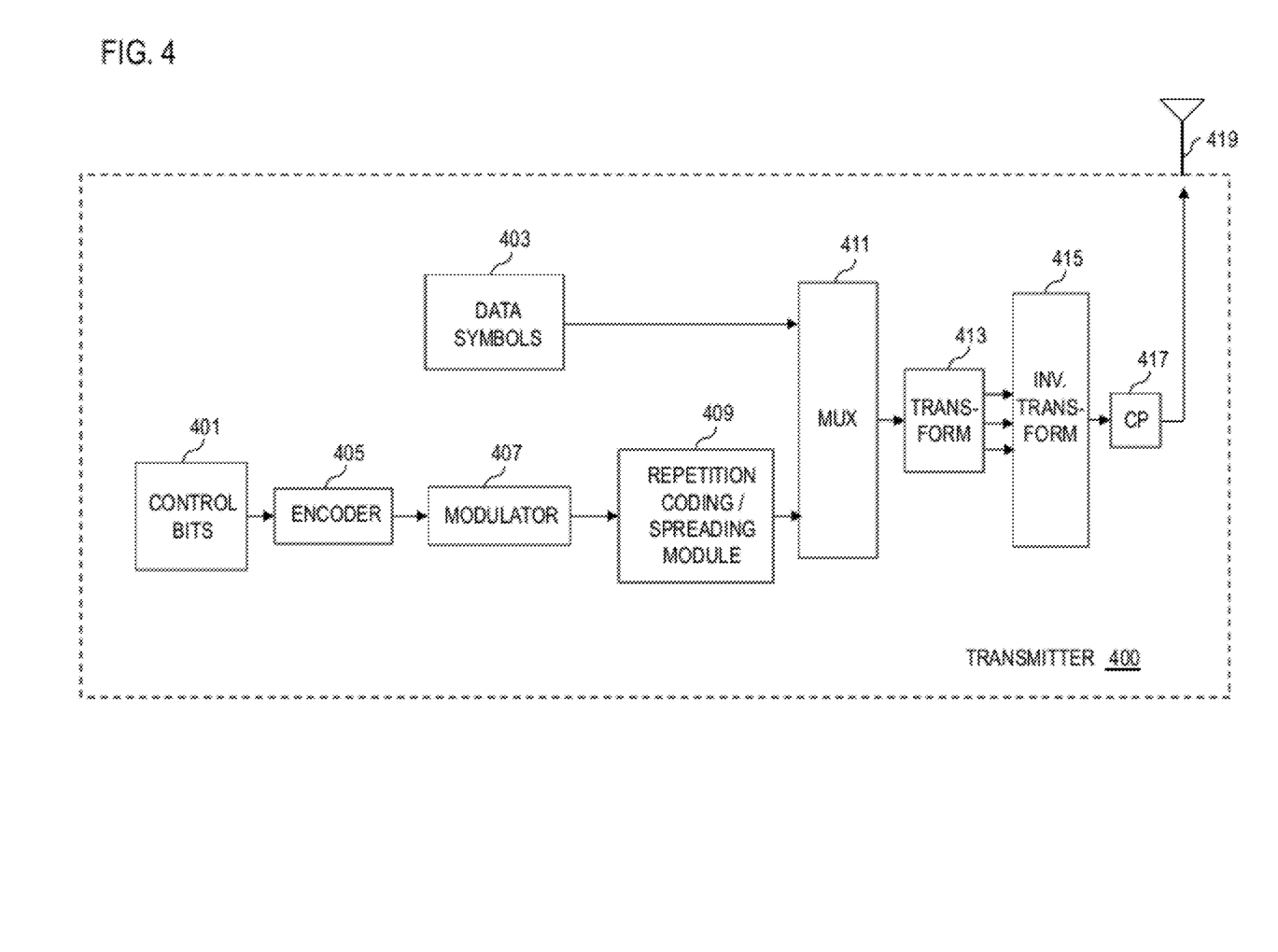
FIG. 4 is a diagram of a transmitter capable of providing symbol level multiplexing, in accordance with an embodiment of the invention.

FIG. 4 is a diagram of a transmitter capable of providing symbol level multiplexing, in accordance with an embodiment of the invention. A transmitter 400 includes a source 401 of control bits and a data source 403. The control bits are encoded by an encoder 405 and subsequently modulated by a modulator 409. The modulated control symbols are then fed to a repetition coding/spreading module 505, which outputs to a multiplexer 411 for multiplexing with data from the data source 403.

The multiplexed symbols are then transformed by a transform 413. In an exemplary embodiment, the transform 413 employs a fast Fourier transform (FFT). The multiplexed symbol data and control bits are subjected to serial/parallel (S/P) conversion to yield parallel data streams. Thereafter, the FFT transform 413 performs the FFT operation based on an estimated FFT window timing to convert a multi-carrier signal into parallel symbol sequences. Then the spread symbol sequences in the number equivalent to the number of all sub-carriers are supplied to an inverse transform 415 (e.g., inverse FFT (IFFT)) to effect time/frequency conversion into multi-carrier components. Cyclic Prefixes are inserted by a cyclic prefix (CP) insertion module 417. The time domain data are then transmitted via an antenna system 419.

Figure 5:
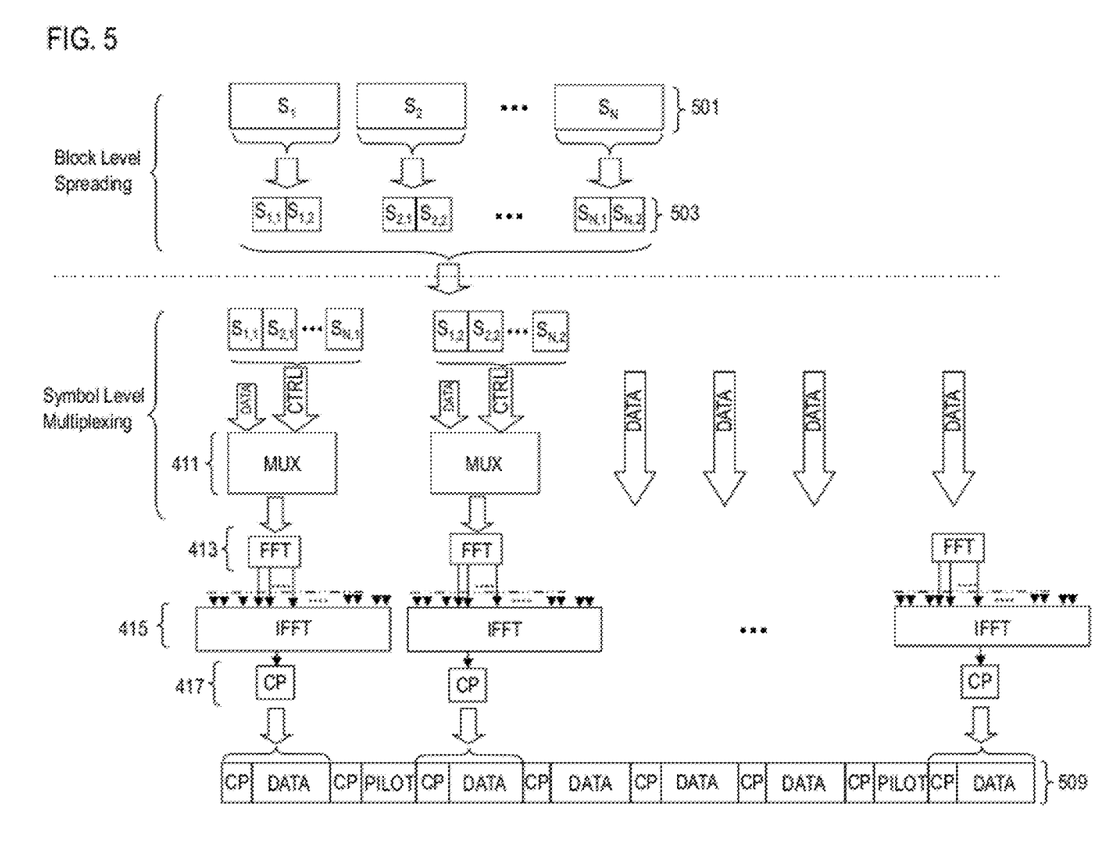
FIG. 5 is a diagram of a Multiple-Input Multiple-Output (MIMO) transmitter configured to generate multiplexed control information and data, in accordance with an embodiment of the invention.

FIG. 5 is a diagram of a Multiple-Input Multiple-Output (MIMO) transmitter configured to generate multiplexed control information and data, in accordance with an embodiment of the invention. Under this scenario, block level spreading is performed using a spread factor of two is applied prior to symbol level (or chip) multiplexing between data and control channels. For instance, control symbols 501, $S_1 \ldots S_N$ are spread into corresponding orthogonal symbols 503, $(S_{1,1}, S_{1,2}) \ldots (S_{N,1}, S_{N,2})$. With a spread factor of two, two orthogonal control resources can be generated—e.g., for two UEs paired to operate in Virtual MIMO mode. It is noted that the block level spreading of control information can be extended not only for the first two LBs as shown in FIG. 3, but can be extended for the other LBs as well (either using SF>2 or using SF=2 with increased number of symbols). The block-level spreading maintains the orthogonality between the code channels, so long as the radio channel does not change during spreading period. In case of single-user MIMO providing two orthogonal resources enables the use of transmitter diversity for control signaling.

Data channels, according to one embodiment, are transmitted without spreading. MUX 411 multiplexes, at the symbol level, the data with the orthogonalized control symbols. The output of the MUX 411, as described in FIG. 4, are sent to the FFT 413, IFFT 415, and then CP module 417 to yield frame structure 509. This arrangement provides multiplexing between data and control (data-associated and data-non-associated) in MIMO and V-MIMO (Virtual MIMO) systems. As such, orthogonal control signaling for MIMO applications with symbol level multiplexing is provided between control and data.

One of ordinary skill in the art would recognize that the processes for providing control information and data multiplexing may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 6.

Figure 6:
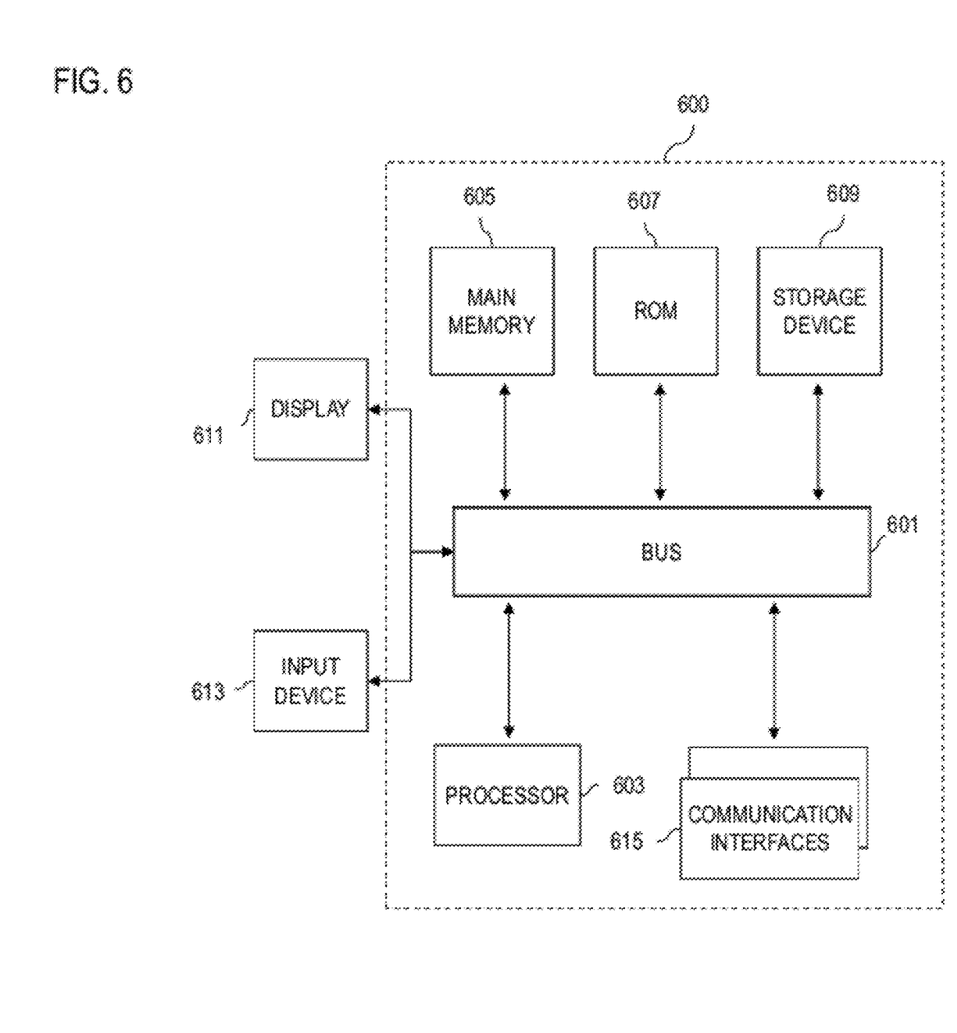
FIG. 6 is a diagram of hardware that can be used to implement an embodiment of the invention.

FIG. 6 illustrates exemplary hardware upon which various embodiments of the invention can be implemented. A computing system 600 includes a bus 601 or other communication mechanism for communicating information and a processor 603 coupled to the bus 601 for processing information. The computing system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computing system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computing system 600 may be coupled via the bus 601 to a display 611, such as a liquid crystal display, or active matrix display, for displaying information to a user. An input device 613, such as a keyboard including alphanumeric and other keys, may be coupled to the bus 601 for communicating information and command selections to the processor 603. The input device 613 can include a cursor control, such as a mouse, a trackball, or cursor direction keys, for communicating direction information and command selections to the processor 603 and for controlling cursor movement on the display 611.

According to various embodiments of the invention, the processes described herein can be provided by the computing system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 600 also includes at least one communication interface 615 coupled to bus 601. The communication interface 615 provides a two-way data communication coupling to a network link (not shown). The communication interface 615 sends and receives electrical, electromagnetic, or optical signals that carry digital data streams representing various types of information. Further, the communication interface 615 can include peripheral interface devices, such as a Universal Serial Bus (USB) interface, a PCMCIA (Personal Computer Memory Card International Association) interface, etc.

The processor 603 may execute the transmitted code while being received and/or store the code in the storage device 609, or other non-volatile storage for later execution. In this manner, the computing system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7A:
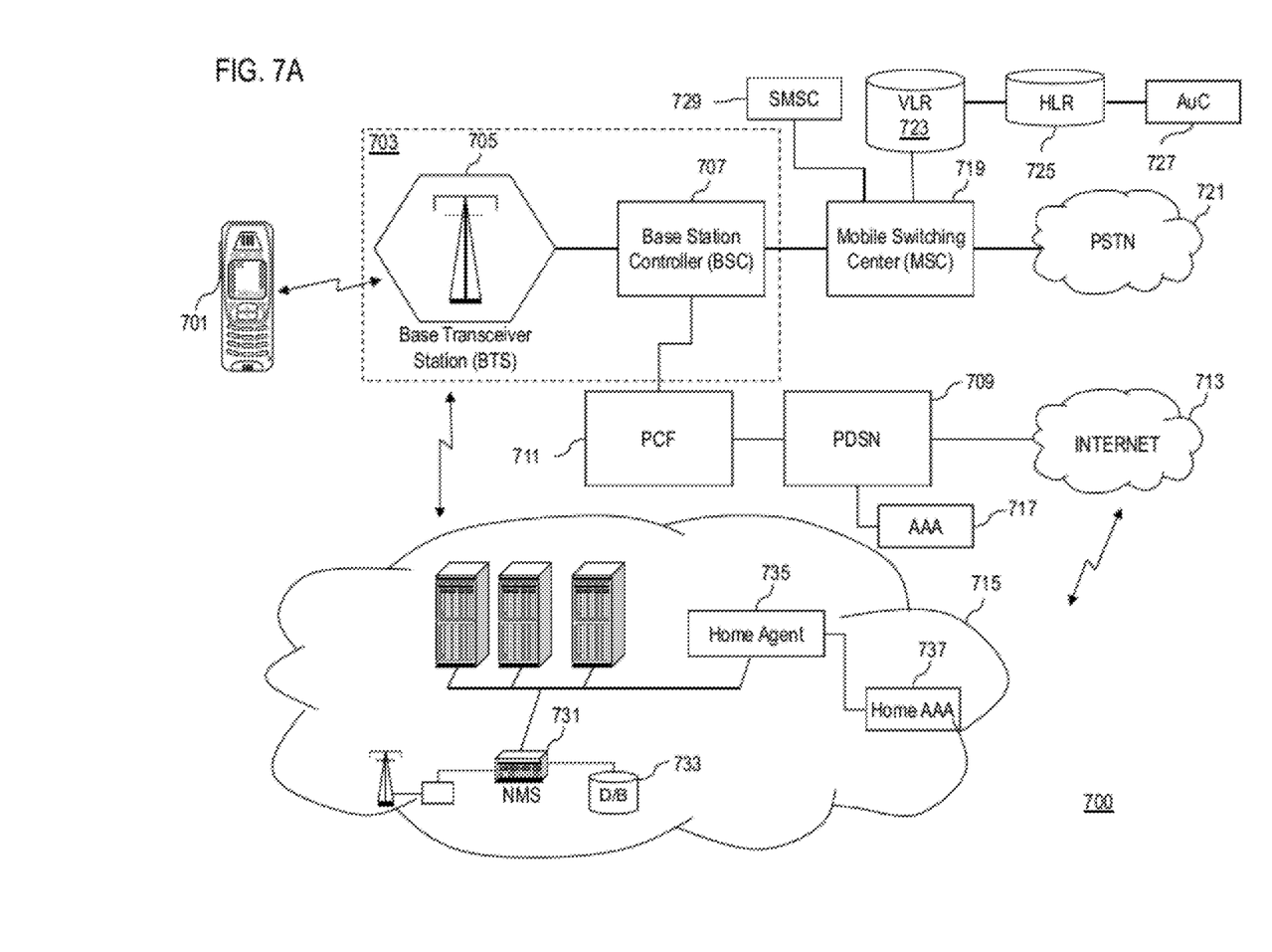
FIGS. 7A and 7B are diagrams of different cellular mobile phone systems capable of supporting various embodiments of the invention.
Figure 7B:
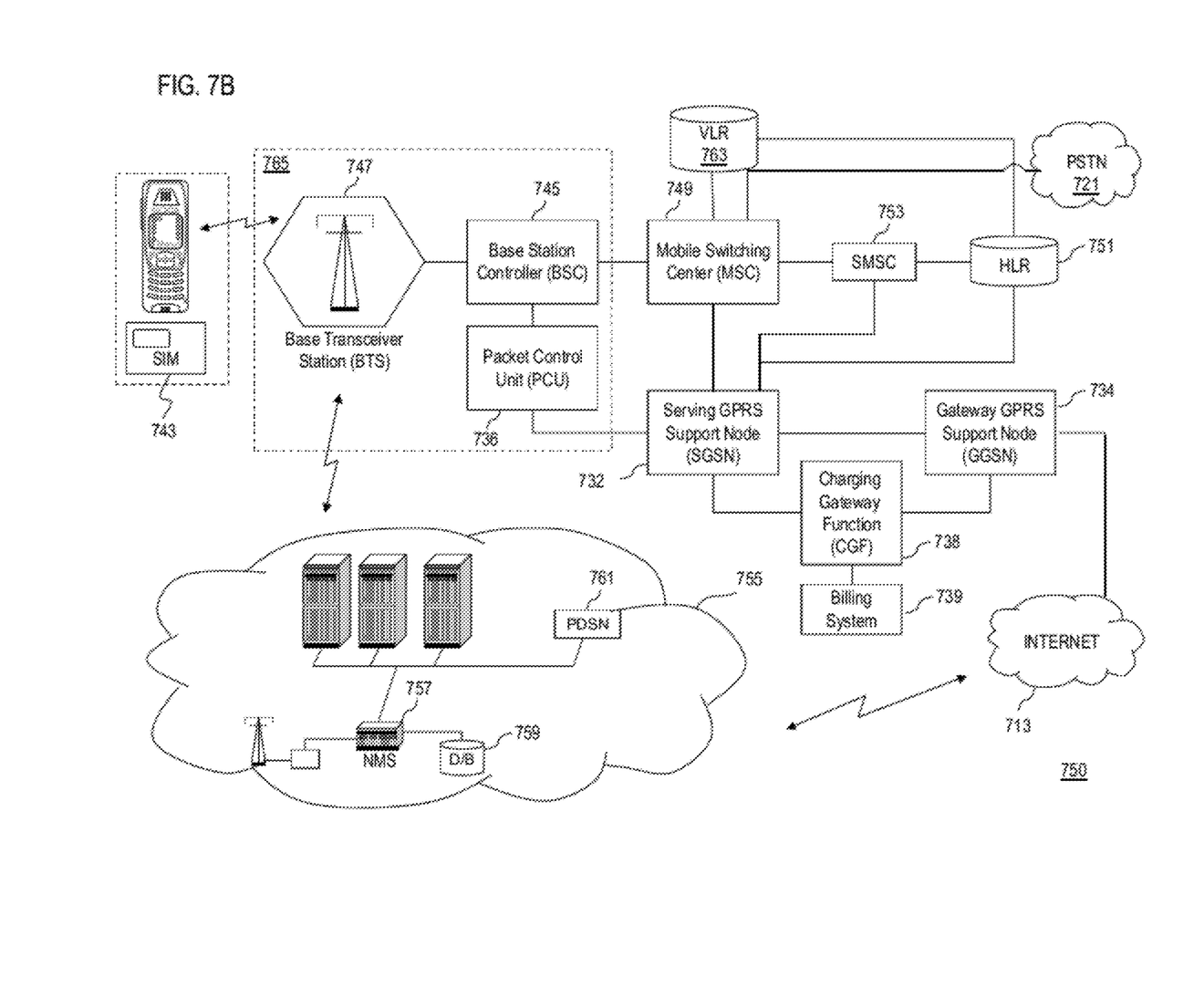

FIGS. 7A and 7B are diagrams of different cellular mobile phone systems capable of supporting various embodiments of the invention. FIGS. 7A and 7B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 700 includes mobile stations 701 (e.g., handsets, terminals, stations, units, devices, or any type of interface to the user (such as "wearable" circuitry, etc.)) in communication with a Base Station Subsystem (BSS) 703. According to one embodiment of the invention, the radio network supports Third Generation (3G) services as defined by the International Telecommunications Union (ITU) for International Mobile Telecommunications 2000 (IMT-2000).

In this example, the BSS 703 includes a Base Transceiver Station (BTS) 705 and Base Station Controller (BSC) 707. Although a single BTS is shown, it is recognized that multiple BTSs are typically connected to the BSC through, for example, point-to-point links. Each BSS 703 is linked to a Packet Data Serving Node (PDSN) 709 through a transmission control entity, or a Packet Control Function (PCF) 711. Since the PDSN 709 serves as a gateway to external networks, e.g., the Internet 713 or other private consumer networks 715, the PDSN 709 can include an Access, Authorization and Accounting system (AAA) 717 to securely determine the identity and privileges of a user and to track each user's activities. The network 715 comprises a Network Management System (NMS) 731 linked to one or more databases 733 that are accessed through a Home Agent (HA) 735 secured by a Home AAA 737.

Although a single BSS 703 is shown, it is recognized that multiple BSSs 703 are typically connected to a Mobile Switching Center (MSC) 719. The MSC 719 provides connectivity to a circuit-switched telephone network, such as the Public Switched Telephone Network (PSTN) 721. Similarly, it is also recognized that the MSC 719 may be connected to other MSCs 719 on the same network 700 and/or to other radio networks. The MSC 719 is generally collocated with a Visitor Location Register (VLR) 723 database that holds temporary information about active subscribers to that MSC 719. The data within the VLR 723 database is to a large extent a copy of the Home Location Register (HLR) 725 database, which stores detailed subscriber service subscription information. In some implementations, the HLR 725 and VLR 723 are the same physical database; however, the HLR 725 can be located at a remote location accessed through, for example, a Signaling System Number 7 (SS7) network. An Authentication Center (AuC) 727 containing subscriber-specific authentication data, such as a secret authentication key, is associated with the HLR 725 for authenticating users. Furthermore, the MSC 719 is connected to a Short Message Service Center (SMSC) 729 that stores and forwards short messages to and from the radio network 700.

During typical operation of the cellular telephone system, BTSs 705 receive and demodulate sets of reverse-link signals from sets of mobile units 701 conducting telephone calls or other communications. Each reverse-link signal received by a given BTS 705 is processed within that station. The resulting data is forwarded to the BSC 707. The BSC 707 provides call resource allocation and mobility management functionality including the orchestration of soft handoffs between BTSs 705. The BSC 707 also routes the received data to the MSC 719, which in turn provides additional routing and/or switching for interface with the PSTN 721. The MSC 719 is also responsible for call setup, call termination, management of inter-MSC handover and supplementary services, and collecting, charging and accounting information. Similarly, the radio network 700 sends forward-link messages. The PSTN 721 interfaces with the MSC 719. The MSC 719 additionally interfaces with the BSC 707, which in turn communicates with the BTSs 705, which modulate and transmit sets of forward-link signals to the sets of mobile units 701.

As shown in FIG. 7B, the two key elements of the General Packet Radio Service (GPRS) infrastructure 750 are the Serving GPRS Supporting Node (SGSN) 732 and the Gateway GPRS Support Node (GGSN) 734. In addition, the GPRS infrastructure includes a Packet Control Unit PCU (736) and a Charging Gateway Function (CGF) 738 linked to a Billing System 739. A GPRS the Mobile Station (MS) 741 employs a Subscriber Identity Module (SIM) 743.

The PCU 736 is a logical network element responsible for GPRS-related functions such as air interface access control, packet scheduling on the air interface, and packet assembly and re-assembly. Generally the PCU 736 is physically integrated with the BSC 745; however, it can be collocated with a BTS 747 or a SGSN 732. The SGSN 732 provides equivalent functions as the MSC 749 including mobility management, security, and access control functions but in the packet-switched domain. Furthermore, the SGSN 732 has connectivity with the PCU 736 through, for example, a Fame Relay-based interface using the BSS GPRS protocol (BSSGP). Although only one SGSN is shown, it is recognized that that multiple SGSNs 731 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 745, any given BSC 745 generally interfaces with one SGSN 732. Also, the SGSN 732 is optionally connected with the HLR 751 through an SS7-based interface using GPRS enhanced Mobile Application Part (MAP) or with the MSC 749 through an SS7-based interface using Signaling Connection Control Part (SCCP). The SGSN/HLR interface allows the SGSN 732 to provide location updates to the HLR 751 and to retrieve GPRS-related subscription information within the SGSN service area. The SGSN/MSC interface enables coordination between circuit-switched services and packet data services such as paging a subscriber for a voice call. Finally, the SGSN 732 interfaces with a SMSC 753 to enable short messaging functionality over the network 750.

The GGSN 734 is the gateway to external packet data networks, such as the Internet 713 or other private customer networks 755. The network 755 comprises a Network Management System (NMS) 757 linked to one or more databases 759 accessed through a PDSN 761. The GGSN 734 assigns Internet Protocol (IP) addresses and can also authenticate users acting as a Remote Authentication Dial-In User Service host. Firewalls located at the GGSN 734 also perform a firewall function to restrict unauthorized traffic. Although only one GGSN 734 is shown, it is recognized that a given SGSN 732 may interface with one or more GGSNs 733 to allow user data to be tunneled between the two entities as well as to and from the network 750. When external data networks initialize sessions over the GPRS network 750, the GGSN 734 queries the HLR 751 for the SGSN 732 currently serving a MS 741.

The BTS 747 and BSC 745 manage the radio interface, including controlling which Mobile Station (MS) 741 has access to the radio channel at what time. These elements essentially relay messages between the MS 741 and SGSN 732. The SGSN 732 manages communications with an MS 741, sending and receiving data and keeping track of its location. The SGSN 732 also registers the MS 741, authenticates the MS 741, and encrypts data sent to the MS 741.

Figure 8:
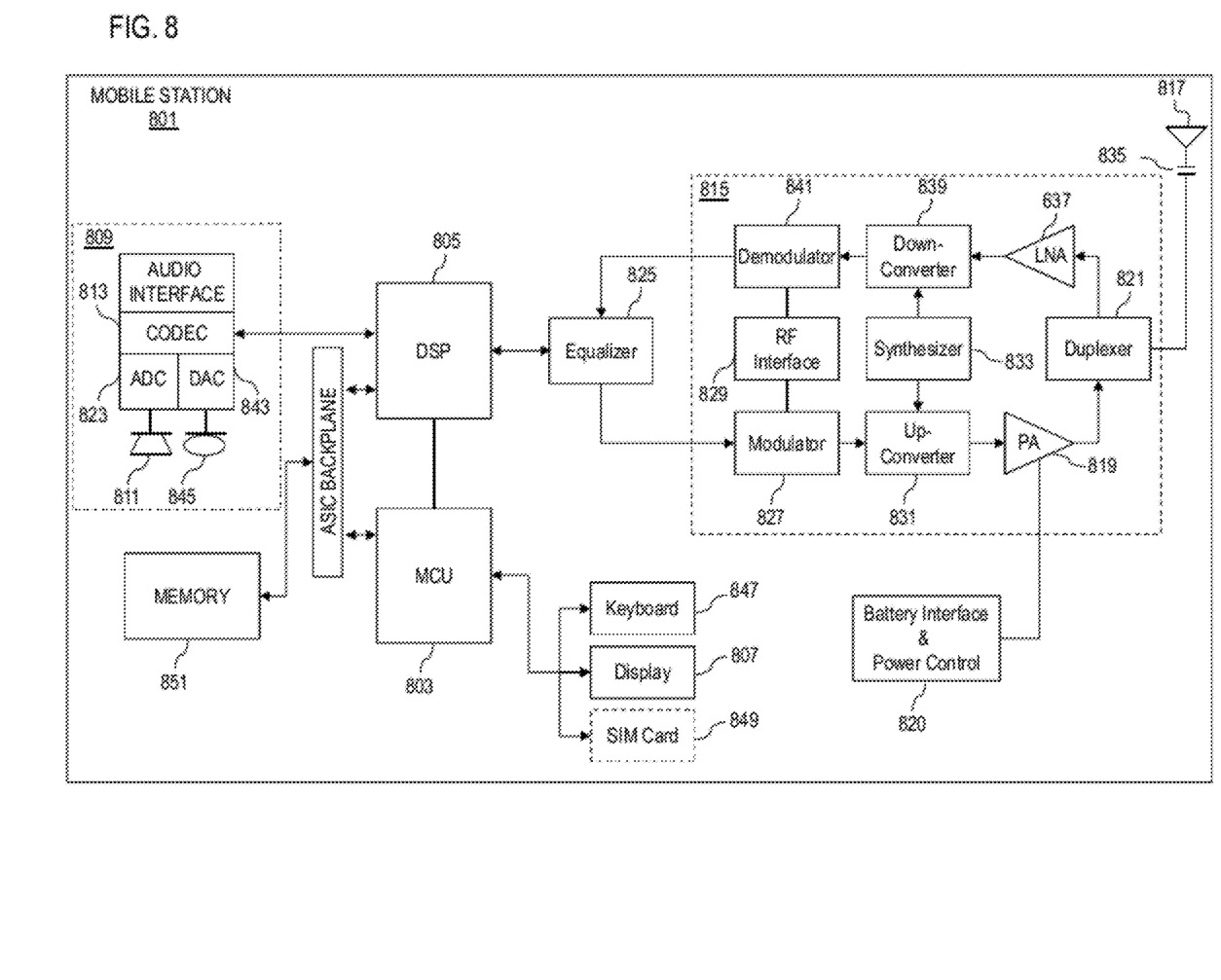
FIG. 8 is a diagram of exemplary components of a mobile station capable of operating in the systems of FIGS. 7A and 7B, according to an embodiment of the invention.

FIG. 8 is a diagram of exemplary components of a mobile station (e.g., handset) capable of operating in the systems of FIGS. 7A and 7B, according to an embodiment of the invention. Generally, a radio receiver is often defined in terms of front-end and back-end characteristics. The front-end of the receiver encompasses all of the Radio Frequency (RF) circuitry whereas the back-end encompasses all of the baseband processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system (e.g., systems of FIG. 7A or 7B), via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The MCU 803 delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 maybe, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

Figure 9:
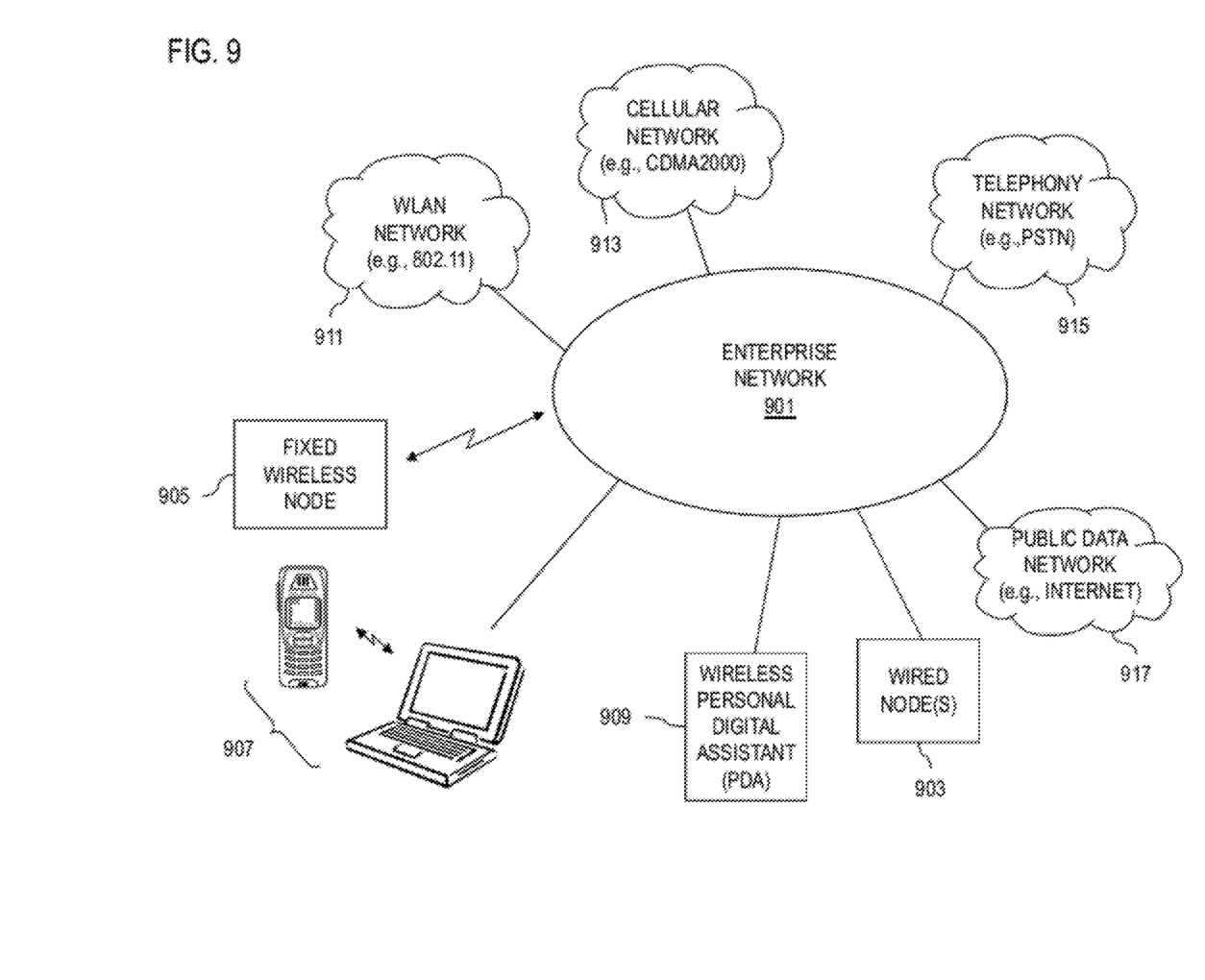
FIG. 9 is a diagram of an enterprise network capable of supporting the processes described herein, according to an embodiment of the invention.

FIG. 9 shows an exemplary enterprise network, which can be any type of data communication network utilizing packet-based and/or cell-based technologies (e.g., Asynchronous Transfer Mode (ATM), Ethernet, IP-based, etc.). The enterprise network 901 provides connectivity for wired nodes 903 as well as wireless nodes 905-909 (fixed or mobile), which are each configured to perform the processes described above. The enterprise network 901 can communicate with a variety of other networks, such as a WLAN network 911 (e.g., IEEE 802.11), a cdma2000 cellular network 913, a telephony network 916 (e.g., PSTN), or a public data network 917 (e.g., Internet).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
receiving data and control information;
applying chip-interleaved block level spreading for the control information to provide orthogonalized control channels; and
multiplexing the data and the spread control information at a symbol level, wherein the data and the spread control symbols are not modified by the multiplexing.
2. The method of claim 1, further comprising applying block level spreading for the control information by allocating different orthogonal block spreading codes to different multiple input multiple output (MIMO) user equipment and/or to different antennas of one MIMO user equipment.
3. The method of claim 2, wherein assignment of the block level spreading code is based on existing dynamic signaling used for resource allocation.
4. The method of claim 1, wherein the multiplexing is time-division multiplexing (TDM)-based.
5. The method of claim 1, further comprising:
transforming the multiplexed information according to a transform function;
applying an inverse of the transform function to the transformed multiplexed information to generate an output signal; and
determining to transmit the output signal over a multiple input multiple output (MIMO) channel.
6. The method of claim 1, further comprising multiplexing the data and the spread control information at a symbol level by multiplexing control signaling comprising pilot, data, and data-associated L1/L2 control signaling.
7. The method of claim 1, further comprising multiplexing the data and the spread control information at a symbol level by multiplexing control signaling comprising pilot, data, data-associated, and data-non-associated L1/L2 control signaling.
8. The method of claim 1, further comprising multiplexing the data and the spread control information at a symbol level by multiplexing control signaling comprising pilot and data-non-associated L1/L2 control signaling.
9. An apparatus comprising:
at least one processor; and
at least one memory including computer program code for one or more programs, the at least one memory and the computer program code configured to, with the at least one processor, cause the apparatus to:
receive data and control information;
apply chip-interleaved block level spreading to the control information to orthogonalize the control information; and multiplex the data and the spread control information at a symbol level, wherein the data and the spread control symbols are not modified by the multiplexing.

10. The apparatus of claim 9, wherein the at least one memory and the computer program are further configured to, with the at least one processor, cause the apparatus to:
apply block level spreading for the control information by allocating different orthogonal block spreading codes to different multiple input multiple output (MIMO) user equipment and/or to different antennas of one MIMO user equipment.

11. The apparatus of claim 10, wherein assignment of the block level spreading code is based on existing dynamic signaling used for resource allocation.

12. The apparatus of claim 9, wherein the multiplexing is time-division multiplexing (TDM)-based.

13. The apparatus of claim 9, wherein the at least one memory and the computer program are further configured to, with the at least one processor, cause the apparatus to:
transform the multiplexed information according to a transform function;
apply an inverse of the transform function to the transformed multiplexed information to generate an output signal; and
determine to transmit the output signal over a multiple input multiple output (MIMO) channel.

* * * * *